US012736706B2

(12) United States Patent
Utsuzawa

(10) Patent No.: US 12,736,706 B2
(45) Date of Patent: Sep. 15, 2026

(54) NMR ECHO SIGNAL CORRECTION TECHNIQUES

(71) Applicant: Schlumberger Technology Corporation, Sugar Land, TX (US)

(72) Inventor: Shin Utsuzawa, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 152 days.

(21) Appl. No.: 18/815,370

(22) Filed: Aug. 26, 2024

(65) Prior Publication Data

US 2026/0056344 A1 Feb. 26, 2026

(51) Int. Cl.
*G01V 3/00* (2006.01)
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC ........... G01R 33/3614; G01R 33/3852; H02M 7/4815; H02M 1/0058; H01F 27/2804
USPC .......................................................... 324/303
See application file for complete search history.

(56) References Cited

U.S. PATENT DOCUMENTS 5,432,446 A 7/1995 MacInnis
5,831,433 A 11/1998 Sezginer
10,222,505 B2 * 3/2019 Reiderman .............. G01V 3/28
10,732,238 B2 8/2020 Chimakurthy
2019/0136652 A1 * 5/2019 Vail, III .................. E21B 21/08
(Continued)

FOREIGN PATENT DOCUMENTS

EP 1972957 A1 * 9/2008 ............. G01R 33/50
EP 3680680 A1 * 7/2020 ....... G01R 33/56572
(Continued)

OTHER PUBLICATIONS

Hurlimann et al., Spin Dynamics of Carr-Purcell-Meiboom-Gill-like Sequences in Grossly Inhomogeneous B0 and B1 Fields and Application to NMR Well Logging, Journal of Magnetic Resonance 143, 120-135 (2000).

(Continued)

*Primary Examiner* — Walter L Lindsay, Jr.
*Assistant Examiner* — Frederick Wenderoth
(74) *Attorney, Agent, or Firm* — Jeffrey D. Frantz

(57) ABSTRACT

The method includes performing, using a nuclear magnetic resonance (NMR) tool, a Carr-Purcell-Meiboom-Gill (CPMG) measurement by transmitting a first excitation pulse and a first plurality of refocusing pulses, and obtaining a first set of NMR echo signals. The method also includes performing a modified CPMG measurement by transmitting a second excitation pulse and a second plurality of refocusing pulses, and obtaining a second set of NMR echo signals. The second excitation pulse is shifted by 0 or π radians relative to the first excitation pulse. A first refocusing pulse of the second plurality of refocusing pulses is shifted by 0 or π radians relative to the second excitation pulse. A subsequent refocusing pulses are shifted by π/2 or −π/2 radians relative to the second excitation pulse. Further, the method includes obtaining a transient-corrected echo train based on the CPMG measurement and the modified CPMG measurement.

20 Claims, 9 Drawing Sheets

(56) References Cited

U.S. PATENT DOCUMENTS

2022/0091295 A1* 3/2022 Reiderman ........ G01R 33/3415
2022/0146701 A1* 5/2022 Lemarenko ............. G01V 1/50

FOREIGN PATENT DOCUMENTS

EP 3483618 B1 * 12/2021 ......... G01R 33/4828
WO WO-2021158929 A1 * 8/2021 ............. G01R 33/44

OTHER PUBLICATIONS

Song, Y.-Q., Categories of Coherence Pathways for the CPMG Sequence, Journal of Magnetic Resonance 157, 82-91 (2002).

* cited by examiner

NMR ECHO SIGNAL CORRECTION TECHNIQUES

BACKGROUND

The present disclosure relates generally to downhole devices and, more specifically, controlling downhole devices using nuclear magnetic resonance (NMR) measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological region is a remarkably complex endeavor. In many cases, decisions involved in hydrocarbon exploration and production may be informed by measurements from downhole well-logging tools that are conveyed deep into the wellbore. The measurements may be used to infer properties or characteristics of the geological region surrounding the wellbore.

One type of downhole well-logging tool uses nuclear magnetic resonance (NMR) to measure the response of nuclear spins in formation fluids to applied magnetic fields. In general, it is advantageous to obtain NMR measurements accurately and relatively quickly. Improving the accuracy of NMR measurements, such as by removing noise or artifacts from the NMR measurements, helps the oil and gas organization or enterprises make oil and gas decisions, such as determining where or where not to drill. While it may be advantageous to acquire NMR measurements quickly, this may reduce the accuracy of the NMR measurements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One aspect of the present disclosure relates to a method. The method includes performing, using an NMR tool, a Carr-Purcell-Meiboom-Gill (CPMG) measurement by transmitting a first excitation pulse and a first plurality of refocusing pulses, and obtaining a first set of NMR echo signals. The method also includes performing, using the NMR tool, a modified CPMG measurement by transmitting a second excitation pulse and a second plurality of refocusing pulses, and obtaining a second set of NMR echo signals, wherein the second excitation pulse is shifted by 0 or $\pi$ radians relative to the first excitation pulse, and wherein a first refocusing pulse of the second plurality of refocusing pulses is shifted by 0 or $\pi$ radians relative to the second excitation pulse, and wherein a second refocusing pulse and subsequent refocusing pulses of the second plurality of refocusing pulses are shifted by $\pi/2$ or $-\pi/2$ radians relative to the second excitation pulse. Further, the method includes obtaining a transient-corrected echo train based on the CPMG measurement and the modified CPMG measurement.

Another aspect of the present disclosure relates to a method. The method includes performing, using an NMR tool, a CPMG measurement by transmitting a first excitation pulse and a first plurality of refocusing pulses, and obtaining a first set of NMR echo signals. The method also includes performing, using the NMR tool, a modified CPMG measurement by transmitting a second excitation pulse and a second plurality of refocusing pulses and obtaining a second set of NMR echo signals. The second excitation pulse is shifted by 0 or $\pi$ radians relative to the first excitation pulse. A first refocusing pulse of the second plurality of refocusing pulses is shifted by 0 or $\pi$ radians relative to the second excitation pulse. A second refocusing pulse and subsequent refocusing pulses of the second plurality of refocusing pulses are shifted by $\pi/2$ or $-\pi/2$ relative to the second excitation pulse. Further, the method includes determining a transient correction factor based on the CPMG measurement and the modified CPMG measurement.

Another aspect of the present disclosure relates to a system. The system includes an NMR tool. The system also includes a control system having a plurality of processors, wherein the control system is configured to perform, using the NMR tool, a CPMG measurement by transmitting a first excitation pulse and a first plurality of refocusing pulses, and obtaining a first set of NMR echo signals; perform, using the NMR tool, a modified CPMG measurement by transmitting a second excitation pulse and a second plurality of refocusing pulses and obtaining a second set of NMR echo signals, wherein the second excitation pulse is shifted by 0 or $\pi$ radians relative to the first excitation pulse, wherein a first refocusing pulse of the second plurality of refocusing pulses is shifted by 0 or $\pi$ radians relative to the second excitation pulse, and wherein a second refocusing pulse and subsequent refocusing pulses of the second plurality of refocusing pulses are shifted by $\pi/2$ or $-\pi/2$ radians relative to the second excitation pulse; and obtain a transient-corrected echo train based on the CPMG measurement and the modified CPMG measurement.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
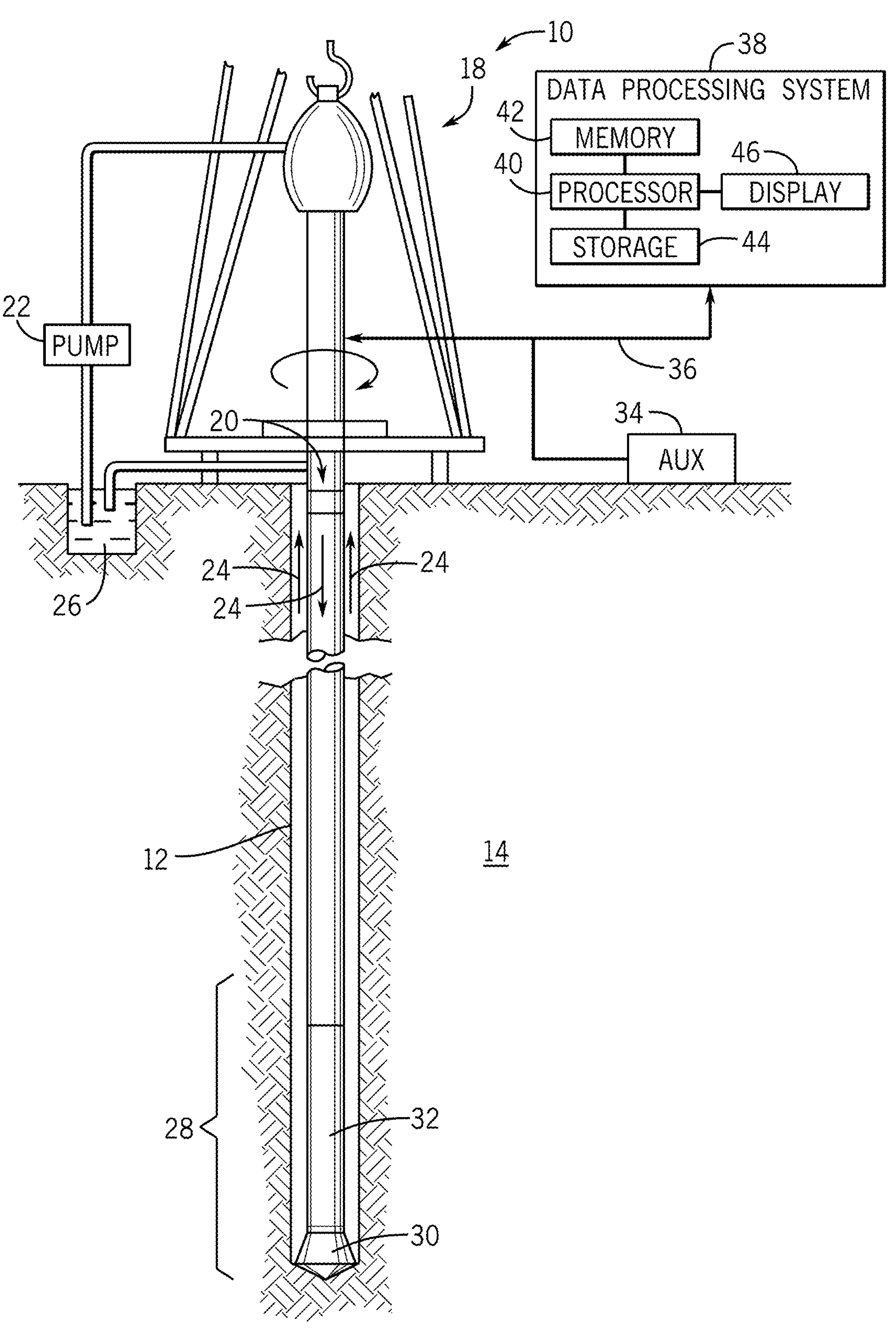
FIG. 1 is a partial cross-sectional view of a downhole device suspended into a subsurface formation, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the present context, the term "about" or "approximately" is intended to mean that the values indicated are not exact and that the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As generally discussed above, oil and gas organizations may use nuclear magnetic resonance (NMR) measurements to inform oil and gas decisions, such as where to drill. For example, the NMR measurements may be Carr-Purcell-Meiboom-Gill (CPMG) measurements. To obtain CPMG measurements, an NMR tool transmits an excitation pulse (e.g., at t=0) and one or more refocusing pulses (e.g., after the excitation pulse) into a measurement volume within a subterranean formation. The NMR tool obtains NMR echoes after the one or more refocusing pulses, and the NMR echoes provide information about the composition of the formation fluids and/or structure (e.g., pore size) of the subterranean formation. In general, NMR signal amplitude is proportional to the number of $^{1}$H (hydrogen) atoms in the measurement volume. In a porous formation, the $^{1}$H (hydrogen) atoms include $^{1}$H-containing fluids, such as oil, gas, and water. Due to certain hardware limitations, signal amplitude at t=0 (i.e., a signal amplitude which is proportional to porosity) cannot be measured. Instead, the NMR signal amplitude at t=0 may be inferred by extrapolating signal amplitudes measured at discrete time steps $t=n \cdot t_E$ ($n=1 \ldots n_E$, where $n_E$ is the total number of echoes to be measured, and $t_E$ is the echo time representing the duration between adjacent refocusing pulses). NMR echoes exhibit a transient behavior. In particular, the second and subsequent echoes (i.e., $n=2 \ldots n_E$) are about 25% larger than the first echo. It is presently recognized that it may be desirable to apply corrections to the echo amplitudes before applying inversion to estimate the initial (t=0) signal amplitude.

Accordingly, the present disclosure relates to NMR echo measurement or signal correction techniques that remove echo transients, out-of-phase components of the NMR signals, and generate a correction factor that may be applied to different NMR measurements. As such, the disclosed techniques may be used to generate more accurate data, such as a porosity measurement, as compared to conventional techniques that do not remove the echo transients of the NMR signal. In general, the disclosed techniques include performing a CPMG measurement that includes a first excitation pulse and a first set of refocusing pulses. The disclosed techniques further include performing a modified CPMG measurement (e.g., at a time period before or after the CPMG measurement) that includes a second excitation pulse and a second set of refocusing pulses. In some embodiments, the second excitation pulse may be phase shifted by 0 or π radians relative to the first excitation pulse of the CPMG measurement. As described in further detail herein, it is presently recognized that by shifting a phase of at least two refocusing pulses of the modified CPMG measurement relative to the second excitation pulse (e.g., of the modified CPMG measurement), a processor may generate a corrected echo train (e.g., a transient-corrected echo train) that corrects echo amplitude variations in the CPMG measurement. In some embodiments, the processor may generate the transient-corrected echo train by combining or averaging the CPMG measurement and the modified CPMG measurement. In any case, the first refocusing pulse (i.e., following the excitation pulse) of the modified CPMG measurement may have a first phase that is shifted by 0 or π radians relative to the second excitation pulse. Further, subsequent refocusing pulses (e.g., the second refocusing pulse and subsequent refocusing pulses following the first refocusing pulse of the modified CPMG measurement) may have a second phase that is shifted by π/2 or −π/2 radians relative to the second excitation pulse.

Furthermore, it is presently recognized that an additional modified CPMG measurement may be used to cancel out-of-phase components of the NMR signal introduced by the first modified CPMG measurement. The disclosed techniques include performing an additional modified CPMG measurement that includes a third excitation pulse and a third set of refocusing pulses. A first refocusing pulse of the third set of refocusing pulses (e.g., of the additional modified CPMG measurement) may have a phase that is shifted by π radians relative to the first refocusing pulse of the second set of refocusing pulses (e.g., of the modified CPMG measurement). An out-of-phase corrected echo train may be generated using the modified CPMG measurement, and the additional modified CPMG measurement. In this way, by performing the modified CPMG measurement and, in some instances, the additional modified CPMG measurement, more accurate NMR measurements (e.g., a porosity measurement, a T1 measurement, a T2 measurement, or a combination thereof) may be obtained, which increases the likelihood of identifying and quantifying fluids within porous formations, and thus improves the efficiency of oil and gas operations.

With the foregoing in mind, FIG. 1 illustrates a drilling system 10 that may employ the systems and methods of this disclosure. Although the description below relates to drilling (e.g., logging-while drilling (LWD)) operations, it should be noted that the disclosed techniques may be applied to other operations, such as wireline operations. The drilling system 10 may be used to drill a borehole 12 into a geological region 14. In the drilling system 10, a drilling rig 18 may rotate a drill string 20 within the borehole 12. As the drill string 20 is rotated, a drilling fluid pump 22 may be used to pump drilling fluid, which may be referred to as "mud" or "drilling mud," downward through the center of the drill string 20, and back up around the drill string 20, as shown by reference arrows 24. At the surface, return drilling fluid may be filtered and conveyed back to a mud pit 26 for reuse. The drilling fluid may travel down to the bottom of the drill string 20 known as the bottom-hole assembly (BHA) 28. The drilling fluid may be used to rotate, cool, and/or lubricate a drill bit 30 that may be a part of the BHA 28. The fluid may exit the drill string 20 through the drill bit 30 and carry drill cuttings away from the bottom of the borehole 12 back to the surface.

The BHA 28 may include the drill bit 30 along with various downhole tools, such as an NMR tool 32. The BHA 28 may thus convey the NMR tool 32 through the geological region 14 via the borehole 12. As described in greater detail herein, the NMR tool 32 may be any suitable downhole tool that emits electromagnetic waves within the borehole 12 (e.g., a downhole environment). The downhole tools, which may include the NMR tool 32, may collect a variety of information relating to the geological region 14 and the state of drilling in the borehole 12. For instance, the downhole tools may be LWD tools that measure physical properties of the geological region 14, such as density, porosity, resistivity, lithology, and so forth. Likewise, the downhole tools may be measurement-while-drilling (MWD) tools that measures certain drilling parameters, such as the temperature, pressure, orientation of the drill bit 30, and so forth.

As discussed further below, the NMR tool 32 may receive energy from an electrical energy device or an electrical energy storage device, such as an auxiliary power source 34 or another electrical energy source to power the tool. In some embodiments, the NMR tool 32 may include a power source (e.g., a turbine/alternator configuration) within the NMR tool 32, such as a battery system or a capacitor to store sufficient electrical energy to emit and/or receive electromagnetic waves.

Communications 36, such as control signals, may be transmitted from a data processing system 38 to the NMR tool 32, and communications 36, such as data signals related to the results/measurements of the NMR tool 32, may be returned to the data processing system 38 from the NMR tool 32. The data processing system 38 may be any electronic data processing system that can be used to carry out the systems and methods of this disclosure. For example, the data processing system 38 may include one or more processors 40, which may execute instructions stored in memory 42 and/or storage 44. The memory 42 and/or the storage 44 of the data processing system 38 may be any suitable article of manufacture that can store the instructions. The memory 42 and/or the storage 44 may be read-only memory (ROM), random-access memory (RAM), flash memory, an optical storage medium, or a hard disk drive, to name a few examples. A display 46, which may be any suitable electronic display, may display images generated by the processor 40. The data processing system 38 may be a local component of the drilling system 10 (i.e., at the surface), within the NMR tool 32 (i.e., downhole), a device located proximate to the drilling operation, and/or a remote data processing device located away from the drilling system 10 to process downhole measurements in real time or sometime after the data has been collected. In some embodiments, the data processing system 38 may be a portable computing device (e.g., tablet, smart phone, or laptop) or a server remote from the drilling system 10. In some embodiments, the NMR tool 32 may store and process collected data in the BHA 28 or send the data to the surface for processing via communications 36 described above, including any suitable telemetry (e.g., electrical signals pulsed through the geological region 14 or mud pulse telemetry using the drilling fluid).

It should be noted that, although the discussion above relates to a drilling system, other downhole equipment or systems may employ the systems and methods of this disclosure. For example, a downhole tool with an NMR tool 32 conveyed by slickline, coiled tubing, wireline, or other delivery systems, may utilize the disclosed systems and methods.

Figure 2:
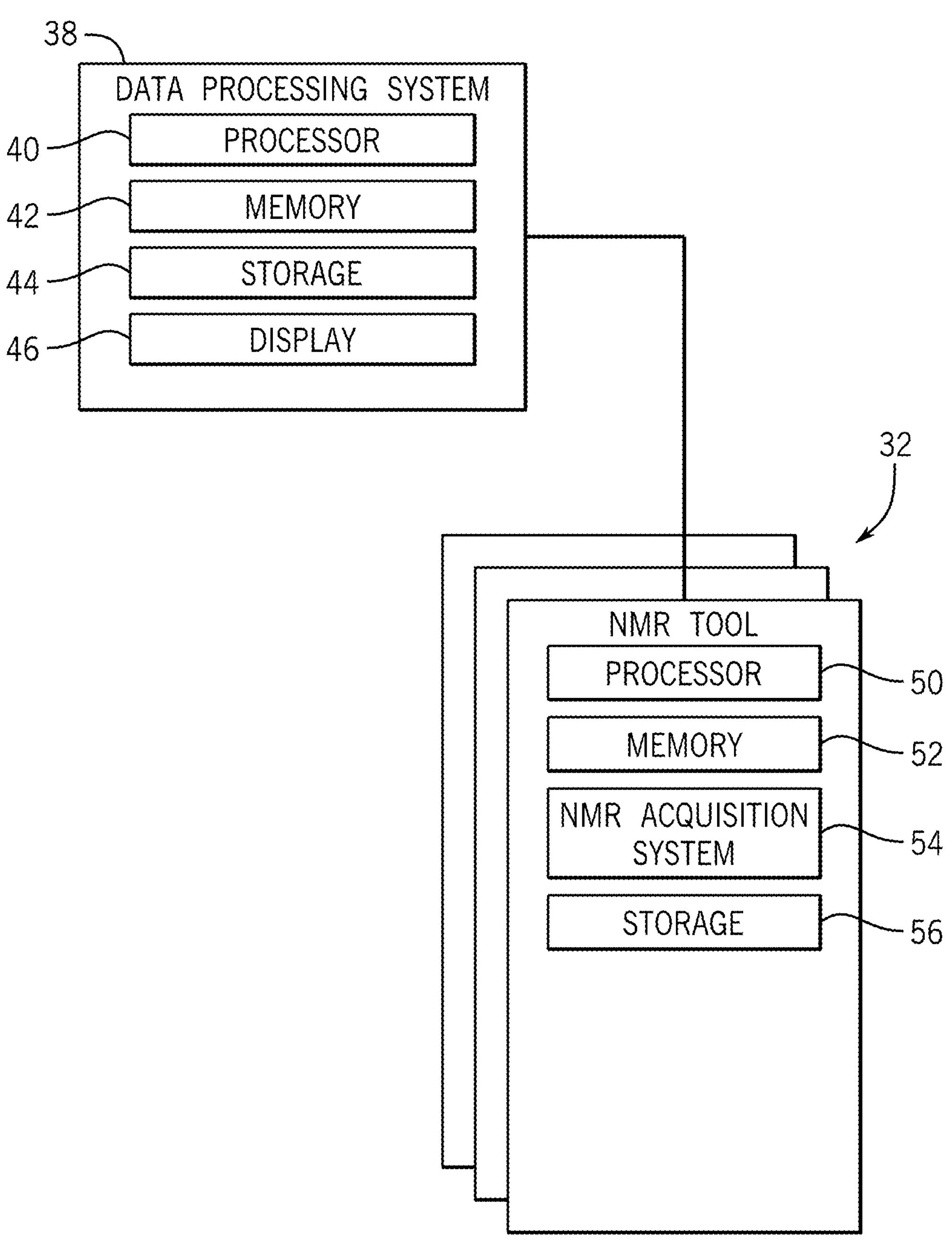
FIG. 2 is a block diagram of a surface control system that is coupled to a downhole device, in accordance with an aspect of the present disclosure.

Operation of drilling system 10 may be controlled by a processor of the data processing system 38. For example, FIG. 2 illustrates a block diagram of the data processing system 38 that is communicatively coupled to the NMR tool 32. In the illustrated embodiment, the NMR tool 32 includes a processor 50, memory 52, an NMR acquisition system 54, and storage 56. In some embodiments, the processor 50 may be ASIC (application specific integrated circuit), field programmable gate array (FPGA), a micro control unit (MCU), a digital signal processor (DSP), and the like. In general, the drilling system 10 communicates with the data processing system 38 via a data cable, telemeter or other suitable techniques. For example, the drilling system 10 may communicate NMR measurements obtained by an NMR sensor of the drilling system 10. In turn, a processor of the surface control system (e.g., or a processor within the downhole tool) may determine certain parameters (e.g., T1, T2, a porosity, a T1/T2 ratio, a water saturation, a permeability) based on the NMR measurements (i.e., the CPMG measurement, the modified CPMG measurement, the additional modified CPMG measurement, or certain combinations as described herein). In such embodiments, the NMR acquisition system 54 may include an emission source (e.g., an antenna) to acquire, obtain, or otherwise measure NMR signals.

Figure 3:
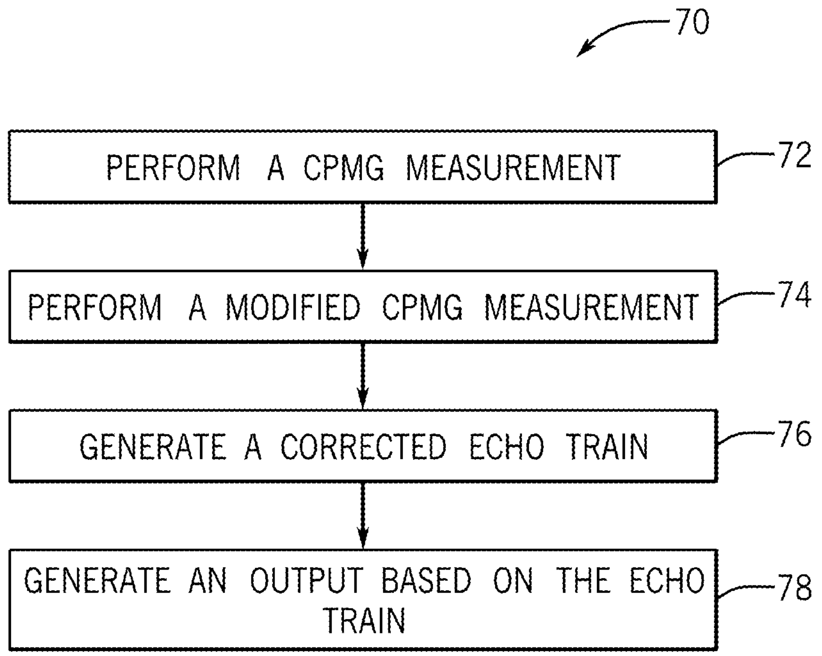
FIG. 3 is a flowchart of a method for generating and utilizing a transient-corrected echo train based on a modified Carr-Purcell-Meiboom-Gill (CPMG) measurement, in accordance with an aspect of the present disclosure.

As described herein, the NMR tool 32 may generate a transient-corrected echo train using a modified CPMG measurement with refocusing pulses that have a respective phase that is shifted relative to a second excitation pulse of the modified CPMG measurement. To illustrate this, FIG. 3 provides a flowchart of a method 70 that may be implemented by a processor 40 of the data processing system 38 or the NMR tool 32 to generate an output (e.g., a porosity measurement) using a transient-corrected echo train. Further, and as discussed below, the method 70 may be implemented by the processor 40 to modify well logging operations (e.g., generate an alert on a display, provide visual indications on a well log), drill operations, and the like, of the drilling system 10 based on NMR measurements measured by an NMR sensor of the NMR tool 32. Although the method 70 has been described as being performed by the processor 40, it should be noted that any suitable processing device may perform the method 70, such as the processor 50 of the NMR tool 32. It should be noted that certain blocks of the process 70 may be omitted, as described in more detail herein.

At block 72, the processor 40 performs a CPMG measurement using the NMR tool 32. In general, performing the CPMG measurement includes the NMR tool 32 activating one or more antennas that transmit a first excitation pulse and a first set of refocusing pulses at respective time periods. For example, the processor 40 and/or the processor 50 may transmit a control signal that activates the antennas of the NMR tool 32 (e.g., based on an input received from an operator) to cause the NMR tool 32 to activate the antennas to transmit the first excitation pulse and the first set of refocusing pulses. Performing the CPMG measurement also includes the antennas of the NMR tool 32 acquiring NMR echoes (e.g., echoes or an echo train) at time periods other than t=0, such as after the first set of refocusing pulses.

As described above, in CPMG measurements, an initial signal amplitude at t=0 (e.g., corresponding to the transmission of the first excitation pulse) that is proportional to the amount of $^{1}H$ atoms in the formation fluids may not be measured due to ringing associated with the excitation pulse (e.g., the first excitation pulse). Instead, the amplitude may be inferred from inversion techniques, which includes fitting the measured echo amplitudes with a set of exponential functions. It may be difficult to determine the true amplitudes of the echoes due to the transient behavior of initial signal amplitudes. In particular, the second and the subsequent echoes (e.g., following the second refocusing pulse and subsequent refocusing pulses) may be about 25% larger than the first echo. Therefore, it is desirable to correct this amplitude variation (e.g., otherwise the resulting fit using an echo train with a transient may provide an unexpected or incorrect measurement), so that a series of measured echoes can be fitted by monotonically decaying exponential functions.

Without wishing to be bound by theory, it should be noted that the size of the initial transient may depends on multiple factors, such as the distribution of the static/oscillating magnetic fields generated by the tool, operating environment (e.g., temperature and borehole/formation conductivity) that affect the transmit/receive bandwidth of the NMR tool 32, and sample properties. Therefore, this correction may have significant uncertainty, and the error introduced in this process is reflected to the error in estimated porosity, T1, T2, or a combination thereof. Accordingly, it may be advantageous to utilize a modified CPMG measurement to generate a transient-corrected echo train as described in more detail below.

At block 74, the processor 40 performs a modified CPMG measurement using the NMR tool 32. In general, performing the modified CPMG measurement includes the NMR tool 32 activating one or more antennas that transmit a second excitation pulse and a second set of refocusing pulses at respective time periods. For example, the processor 40 and/or the processor 50 may transmit a control signal that activates the antennas of the NMR tool 32 (e.g., based on an input received from an operator) to cause the NMR tool 32 to activate the antennas to transmit the second excitation pulse and the second set of refocusing pulses. As described herein, the second excitation pulse and/or one or more of the second set of refocusing pulses may have a respective phase that is shifted relative to the first excitation pulse and/or one or more of the first set of refocusing pulses (e.g., corresponding to the CPMG measurement discussed with reference to block 72). For example, a first refocusing pulse of the modified CPMG measurement (e.g., occurring after the second excitation pulse of the modified CPMG measurement) may be phase shifted by 0 or $\pi$ radians relative to the second excitation pulse of the modified CPMG measurement. Further, the second refocusing pulse and the following refocusing pulses of the modified CPMG measurement may be phase shifted by $\pm\pi/2$ radians relative to the second excitation pulse. Performing the modified CPMG measurement also includes the antennas of the NMR tool 32 acquiring additional NMR echoes at time periods after the second set of refocusing pulses.

At block 76, the processor 40 generates a corrected echo train (e.g., transient-corrected echo train, adjusted-amplitude echo train) based on the CPMG measurement (e.g., performed as described with reference to block 72) and the modified CPMG measurement (e.g., performed as described with reference to block 74). As described herein, the NMR tool 32 acquires NMR echoes during the CPMG measurement and the modified CPMG measurement. As such, to generate the transient-corrected echo train, the processor 40 may receive the echo trains obtained during the CPMG measurement and the modified CPMG measurement and combine the echo trains. In some embodiments, combining the echo trains includes summing the echo trains. In some embodiments, combining the echo trains includes averaging the echo trains. In some embodiments, combining the echo trains includes subtracting one of the echo trains from another.

As discussed above, certain blocks of the process 70 may be omitted in certain embodiments. In some embodiments, the process 70 may end at block 76 (e.g., block 78 may be omitted). For example, the processor 40 may store the transient-corrected echo train in the memory 42 or another suitable storage. However, in some instances, the transient-corrected echo train may be used to modify an oil and gas operation, such as a well logging operation as described below.

At block 78, the processor 40 generates an output, such as a porosity measurement, a T1 measurement, a T2 measurement, or a combination thereof. In some embodiments, the processor 40 may generate an alert, a control signal, or otherwise that may be used (e.g., by a computing device) to modify, adjust, or change a well logging operation (e.g., an operation associated with the drilling system 10) based on the transient-corrected echo train, such as by outputting an alert or a control signal that modifies operation of the drilling system 10 or other well operation system. In some embodiments, the processor 40 may adjust a translation rate of well logging operations, such as a rate of penetration (ROP) of a logging-while-drilling (LWD) device, and the like. In an embodiment where the operational adjustment output includes an alert, the operational adjustment output may cause a display (e.g., the display 46) to display an alert including information or instructions for an operator to reduce the rate of penetration (ROP) of the drilling system 10. In some embodiments, the alert may indicate an ROP range, thereby informing the operator of a suitable ROP range that provides NMR measurements having a particular accuracy.

As described above, the processor 40 may combine the echo trains acquired during the CPMG measurement and the modified CPMG measurement. For example, it is presently recognized that it may be advantageous to adjust the phases of the transmitted pulses ($\varphi_{90}$ and $\varphi_{180(1\ldots nE)}$) to select a particular set of coherence pathways, so that the initial signal transient is eliminated. This may be done in a minimum of two steps. First, and as described above in FIG. 3, the NMR tool 32 may perform a conventional CPMG pulse sequence. This generates an echo train with the second and the following echoes larger than the first echo, as previously shown. Next, the NMR tool 32 may perform another pulse sequence (e.g., the modified CPMG measurement) that has the same timings as the conventional CPMG, but with pulse phases that are adjusted to generate an echo train with the second and the following echoes smaller than the first echo. Adding or combining two echo trains from the first and the second steps provides an echo train (e.g., a transient-corrected echo train) with constant amplitude, which is equal to the amplitude of the first echo in the absence of T2 relaxation. More details are given below.

Figure 4:
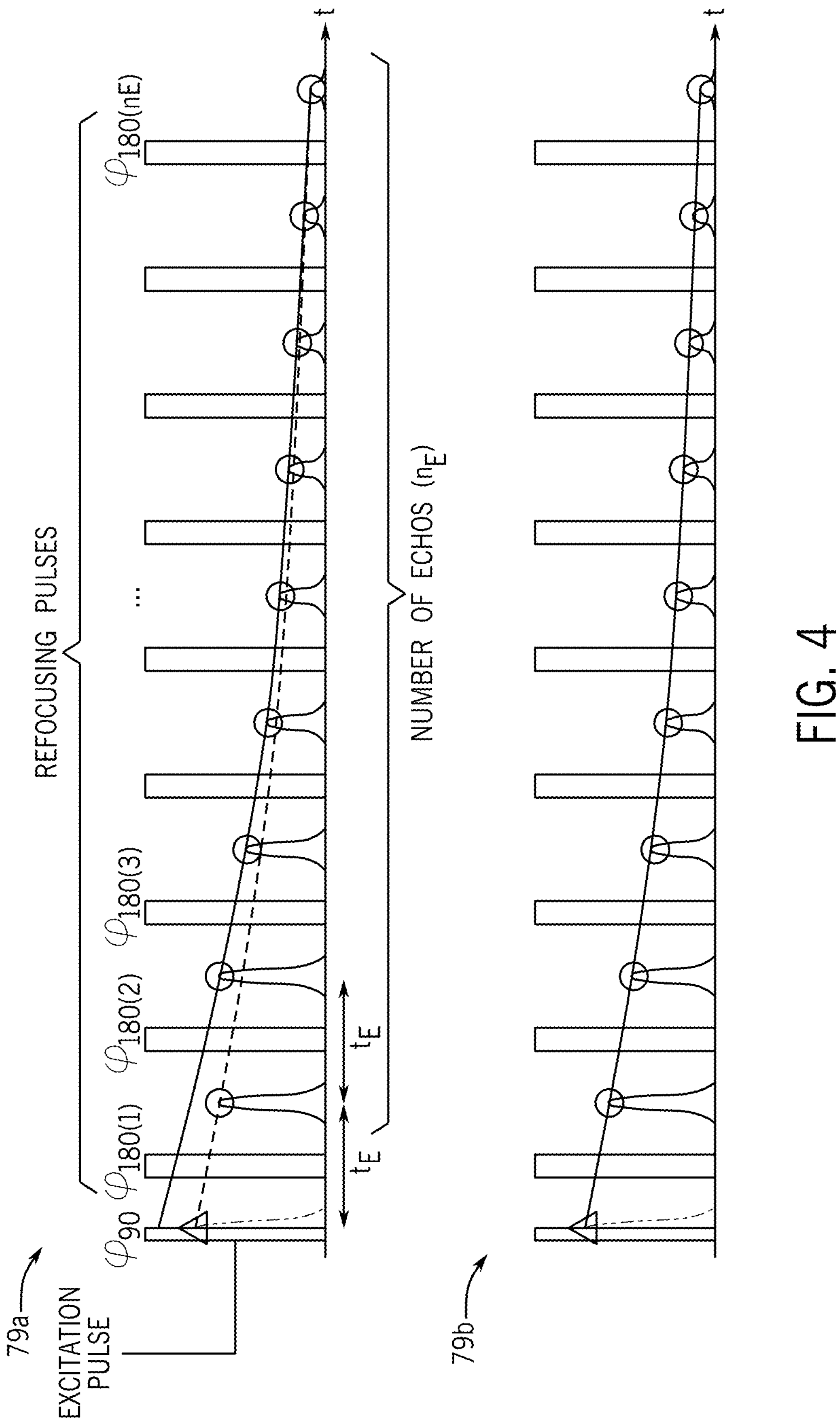
FIG. 4 shows a first graph illustrating a CPMG measurement with an initial echo transient and a second graph illustrating a CPMG measurement with the initial echo transient corrected, in accordance with an aspect of the present disclosure.

FIG. 4 shows a first graph 79*a* illustrating a CPMG measurement with echo transient, and a second graph 79*b* illustrating an echo train with transient removed or corrected. In particular, the first graph 79*a* shows the free induction decay (FID) (at (90). As described herein, the amplitude of the FID (e.g., NMR FID) may be unmeasurable or undeterminable by conventional techniques. As such, a processor may attempt to fit the decay of the NMR echo amplitudes after the refocusing pulses to determine the amplitude of the NMR FID. However, due to the transient in the amplitudes of the NMR echoes, a processor may determine an improper fit (e.g., solid line of the first graph 79*a*), and thus improperly determine the NMR FID amplitude to be higher (in this illustrated example) than the actual value (e.g., as shown with the correct fit (dashed line)). The second graph 79*b* shows the echo train with transient corrected or removed, having the amplitudes of each NMR echo being corrected.

Figure 5:
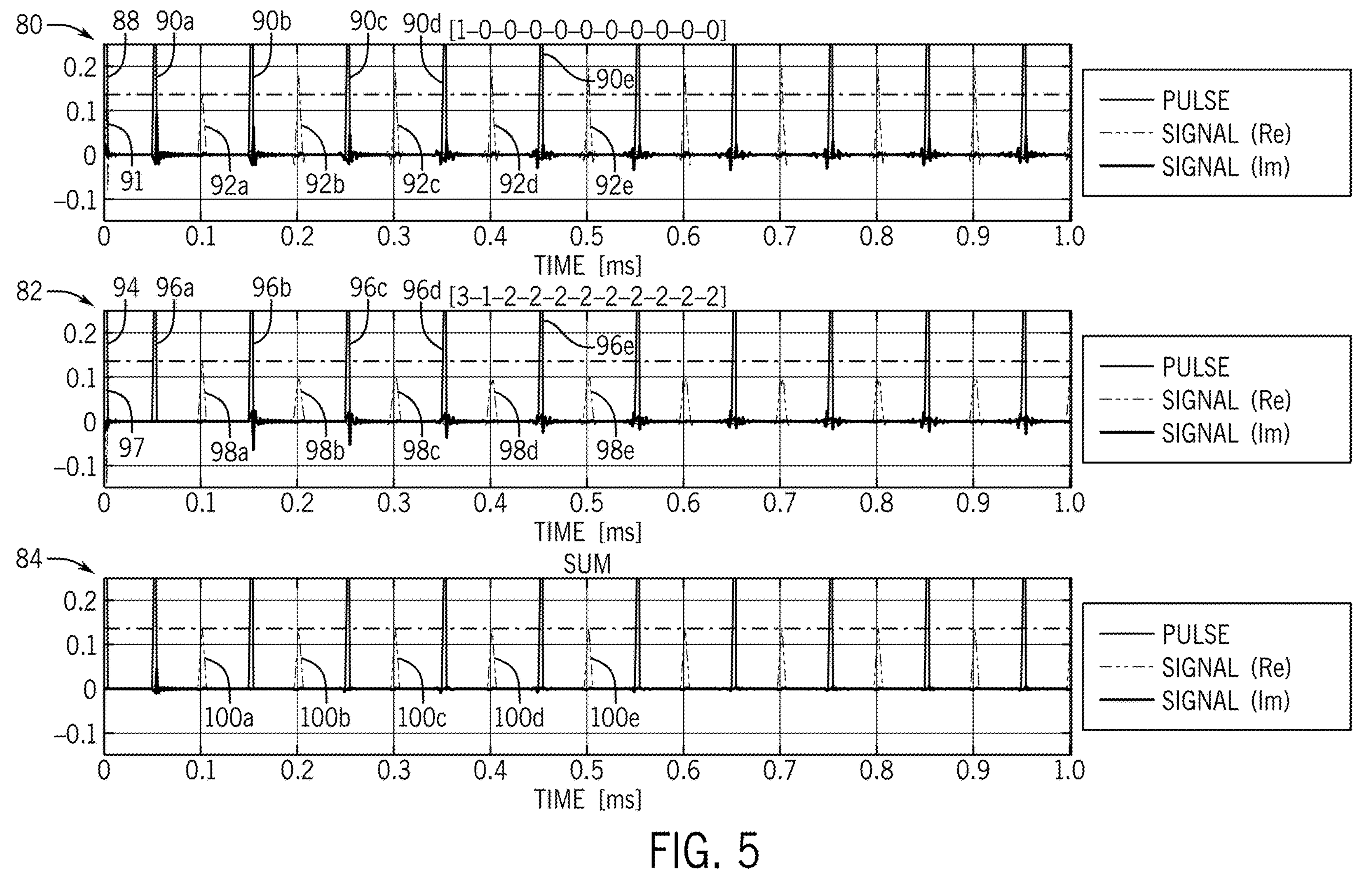
FIG. 5 shows a first graph corresponding to a CPMG measurement, a second graph corresponding to a modified CPMG measurement, and a third graph corresponding to a transient-corrected echo train, in accordance with an aspect of the present disclosure.

To further illustrate this, FIG. 5 shows a first graph 80 corresponding to the CPMG measurement, a second graph 82 corresponding to the modified CPMG measurement, and a third graph 84 corresponding to the transient-corrected echo train. In particular, the first graph 80 shows an excitation pulse 88 at t=0, refocusing pulses 90*a*, 90*b*, 90*c*, 90*d*, 90*e* (e.g., collectively refocusing pulses 90), an NMR FID 91, and NMR echoes 92*a*, 92*b*, 92*c*, 92*d*, 92*e* (e.g., collectively NMR echoes 92 or a first echo train) occurring after the refocusing pulses 90. It should be noted that only five echoes are labeled for simplicity.

The first graph 80 corresponds to a conventional CPMG measurement used in NMR well logging, which satisfies $|\varphi_{90}-\varphi_{180(N)}|=\pi/2$, where $\varphi_{90}$ is the phase of the excitation pulse and $\varphi_{180(N)}$ is the phase of the refocusing pulses, with $N=1 \ldots n_E$ indicating the N-th refocusing pulse. The second echo 92*b* and the following echoes are about 25% larger than the first echo 92*a*. As described herein, the NMR tool 32 may be unable to acquire the NMR FID 91 signal due to ringing, and need to infer its amplitude from the amplitudes of the following echoes.

The second graph 82 shows an excitation pulse 94 at t=0, refocusing pulses 96*a*, 96*b*, 96*c*, 96*d*, 96*e* (e.g., collectively refocusing pulses 96), an NMR FID 97, and NMR echoes 98*a*, 98*b*, 98*c*, 98*d*, 98*e* (e.g., collectively NMR echoes 98 or a second echo train) occurring after the refocusing pulses 96. The second graph 82 is a modified CPMG, which satisfies $|\varphi_{90}-\varphi_{180(1)}|=\pi$ (as shown) or 0 (not shown), and $|\varphi_{90}-\varphi_{180(2 \ldots nE)}|=\pi/2$ as in the conventional CPMG. This yields an echo train with the second echo 98*b* and the following echoes (e.g., 98*c*, 98*d*, 98*c*, and so on) that are about 25% smaller than the first echo 98*a*.

The third graph 84 is the average or mean of the CPMG measurement corresponding to the first graph 80 and the modified CPMG measurement corresponding to the second graph 82, which yields NMR echoes 100*a*, 100*b*, 100*c*, 100*d*, 100*e* (e.g., collectively NMR echoes 100 or a third echo train) with constant amplitude, allowing correct fit to infer FID amplitude. That is, echoes 100*a*, 100*b*, 100*c*, 100*d*, 100*e* in the third graph 84 is the average of the echoes 92*a*, 92*b*, 92*c*, 92*d*, and 92*c* and the NMR echoes 98*a*, 98*b*, 98*c*, 98*d*, and 98*c*.

As shown, the first graph 80 includes "[1-0-0-0-0-0-0-0-0-0-0]". This represents the phase of the pulses (i.e., the excitation pulse 88 and the refocusing pulses 90). In general, the order of the numbers corresponds to the order of the pulses (e.g., the first number, "1", corresponds to the phase of the excitation pulse, and the second number, "0" corresponds to the phase of the first refocusing pulse). Likewise, the second graph includes "[3-1-2-2-2-2-2-2-2-2-2]", which corresponds to the phase of the second excitation pulse 94 and the second set of refocusing pulses 96. In general, "0" indicates a phase shift of 0 radians with respect to the phase of the receiver, "1" indicates a phase shift of $\pi/2$ radians with respect to the phase of the receiver, "2" indicates a phase shift of $\pi$ radians with respect to the phase of the receiver, and "3" indicates a phase shift of $3\pi/2$ radians with respect to the phase of the receiver. It should be noted that the phase shifts shown in FIG. 4 are meant to be non-limiting, and that other combinations of phase shifts may be used. Table 1 shows a non-limiting example of phase shifts of the excitation pulse 88 and the refocusing pulses 90 (left column) and the excitation pulse 94 and the refocusing pulses 96 (right column), both with respect to the phase of the receiver. " . . . " indicates the same phase used throughout the rest of the refocusing pulses.

TABLE 1

Example phase shifts of pulses for the CPMG measurement and the modified CPMG measurement.

| CPMG | Modified CPMG |
|---|---|
| [0 1 1 . . .] | [2 0 1 . . .] |
| [0 1 1 . . .] | [2 0 3 . . .] |
| [0 1 1 . . .] | [2 2 1 . . .] |
| [0 1 1 . . .] | [2 2 3 . . .] |
| [0 3 3 . . .] | [2 0 1 . . .] |
| [0 3 3 . . .] | [2 0 3 . . .] |
| [0 3 3 . . .] | [2 2 1 . . .] |
| [0 3 3 . . .] | [2 2 3 . . .] |
| [1 0 0 . . .] | [3 1 0 . . .] |
| [1 0 0 . . .] | [3 1 2 . . .] |
| [1 0 0 . . .] | [3 3 0 . . .] |
| [1 0 0 . . .] | [3 3 2 . . .] |
| [1 2 2 . . .] | [3 1 0 . . .] |
| [1 2 2 . . .] | [3 1 2 . . .] |
| [1 2 2 . . .] | [3 3 0 . . .] |
| [1 2 2 . . .] | [3 3 2 . . .] |
| [2 1 1 . . .] | [0 0 1 . . .] |
| [2 1 1 . . .] | [0 0 3 . . .] |
| [2 1 1 . . .] | [0 2 1 . . .] |
| [2 1 1 . . .] | [0 2 3 . . .] |
| [2 3 3 . . .] | [0 0 1 . . .] |
| [2 3 3 . . .] | [0 0 3 . . .] |
| [2 3 3 . . .] | [0 2 1 . . .] |
| [2 3 3 . . .] | [0 2 3 . . .] |
| [3 0 0 . . .] | [1 1 0 . . .] |
| [3 0 0 . . .] | [1 1 2 . . .] |
| [3 0 0 . . .] | [1 3 0 . . .] |
| [3 0 0 . . .] | [1 3 2 . . .] |
| [3 2 2 . . .] | [1 1 0 . . .] |
| [3 2 2 . . .] | [1 1 2 . . .] |
| [3 2 2 . . .] | [1 3 0 . . .] |
| [3 2 2 . . .] | [1 3 2 . . .] |

Figure 6:
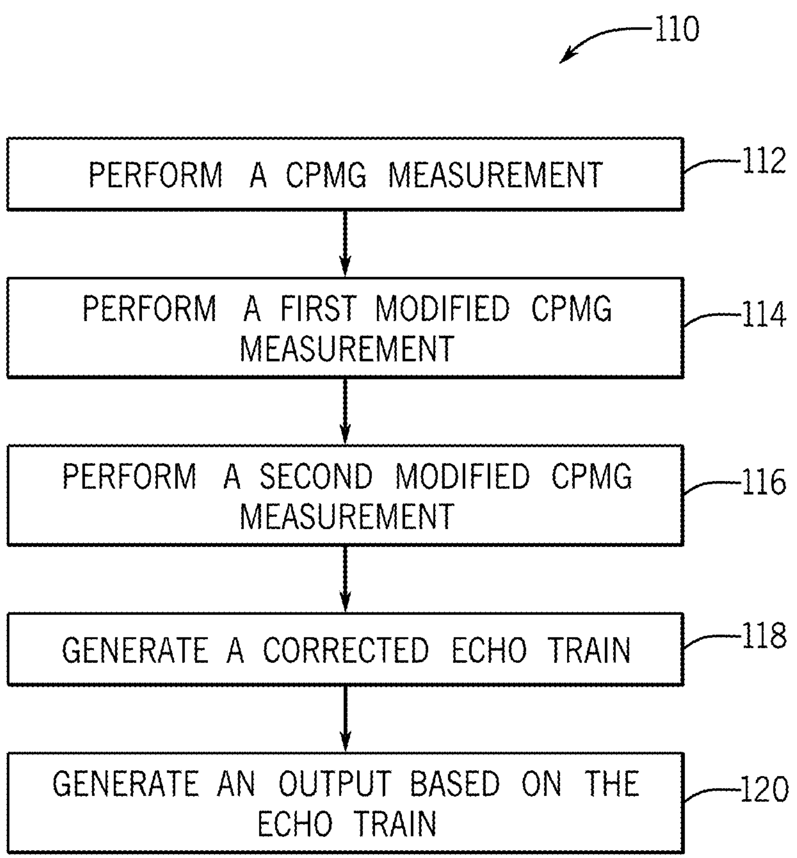
FIG. 6 is a flowchart of a method for generating and utilizing a transient-corrected echo train based on modified CPMG measurements, in accordance with an aspect of the present disclosure.

As described above, in some embodiments, it may be advantageous to perform an additional modified CPMG measurement that may be used to cancel out-of-phase components of the NMR signal. For example, it may be beneficial to remove the out-of-phase components for robust signal processing (e.g., phase correction, noise assessment). This may be accomplished by running two modified CPMG measurements, with one satisfying $|\varphi_{90}-\varphi_{180(1)}|=0$ and the other satisfying $|\varphi_{90}-\varphi_{180(1)}|=\pi$. It is presently recognized that combining the average of two echo trains from two modified CPMG measurements with an echo train from a conventional CPMG provides an echo train with constant amplitude in the in-phase channel (Re) and nothing left in the out-of-phase channel (Im). It should be noted that conventional CPMG echo train may be replaced by a sum of echo trains from phase-alternated CPMG for ringing/offset cancellation, To illustrate this, FIG. 6 provides a flowchart of a method 110 that may be implemented by a processor 40 of the data processing system 38 or the NMR tool 32 for generating a porosity measurement, a T1 measurement, a T2 measurement, or a combination thereof, or modifying well logging operations (e.g., generate an alert on a display, provide visual indications on a well log), drill operations, and the like, of the drilling system 10 based on NMR measurements measured by an NMR sensor of the NMR tool 32. Although the method 110 has been described as being performed by the processor 40, it should be noted that any suitable processing device may perform the method 110, such as the processor 50 of the NMR tool 32.

At block 112, the processor 40 performs a CPMG measurement. In general, the processor 40 may perform block 112 in a generally similar manner as described in block 72 with reference to FIG. 3. At block 114, the processor 40 performs a first modified CPMG measurement. In general, the processor 40 may perform block 114 in a generally similar manner as described with reference to block 74 of FIG. 3.

At block 116, the processor 40 performs a second modified CPMG measurement. In general, the processor 40 may perform block 116 in a generally similar manner as described in block 74 with reference to FIG. 3, however the phase of the pulses of the second modified CPMG measurement may be shifted. For example, the first refocusing pulse of the second modified CPMG measurement may be shifted by $\pi$ radians relative to the first refocusing pulse of the first modified CPMG measurement.

At block 118, the processor 40 generates, determines, or obtains a corrected echo train (e.g., out-of-phase corrected echo train) based on the CPMG measurement (e.g., performed as described with reference to block 112), the first modified CPMG measurement (e.g., performed as described with reference to block 114), and the second modified CPMG measurement (e.g., performed as described with reference to block 116). To generate an echo train with the out-of-phase removed or corrected, the processor 40 may average the echo trains from the first modified CPMG measurement and the second modified CPMG measurement. Then, the processor 40 may combine or take the average of the out-of-phase corrected echo train with the echo train of the CPMG measurement (e.g., conventional CPMG measurement) to generate a transient-corrected echo train without out-of-phase components. Further details are described with reference to FIGS. 6 and 7.

At block 120, the processor 40 generates, determines, or obtains an output based on the transient-corrected echo train without out-of-phase components. In general, the processor 40 may perform block 120 in a generally similar manner as described in block 78 with reference to FIG. 3. For example, the output may be a control signal sent by the processor 40 that modifies, adjusts, or changes a well logging operation (e.g., an operation associated with the drilling system 10) based on the corrected echo train. In some embodiments, block 120 may be omitted from process 110. For example, the processor 40 may generate the transient-corrected echo train and store the transient-corrected echo train in the memory 42 or another suitable memory.

However, in some embodiments, the output may be a porosity measurement (e.g., a porosity output) and/or a T1-T2 measurement. For example, the processor 40 or another suitable processor may utilize the transient-corrected echo train to determine a porosity and/or T1-T2 values using an inversion process. By utilizing the transient-corrected echo train described herein, the output (e.g., the porosity measurement and/or the T1-T2 measurement) may be more accurate as compared to conventional techniques for determining the amount and/or producibility of oil and gas. In this way, the disclosed techniques may improve the efficiency of oil and gas operations by providing more accurate information used to make oil and gas related decisions.

Figure 7:
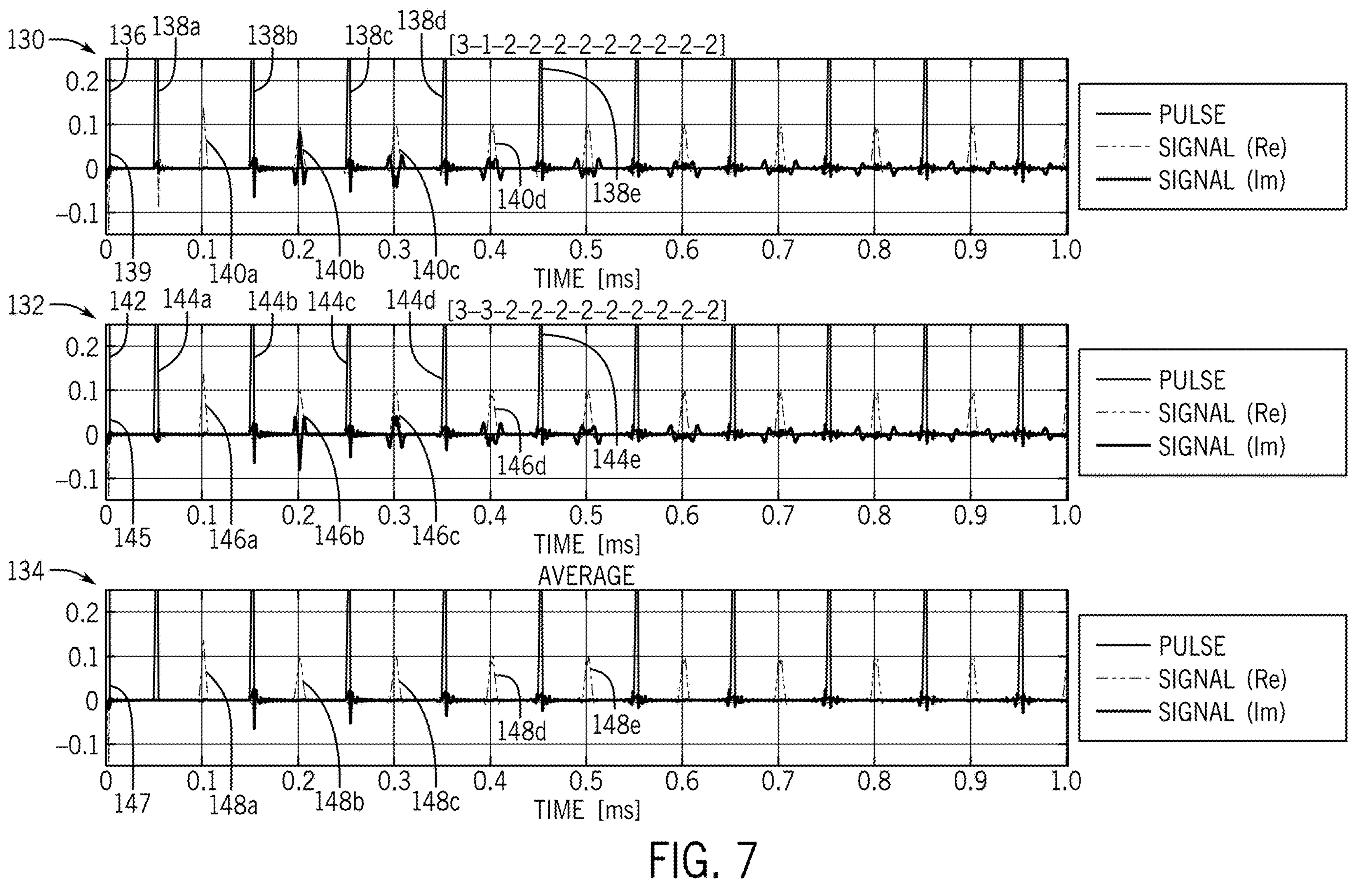
FIG. 7 shows a first graph corresponding to a first modified CPMG measurement, a second graph corresponding to a second modified CPMG measurement, and a third graph that includes an out-of-phase corrected echo train, in accordance with an aspect of the present disclosure.

To illustrate the process 110, FIG. 7 shows a first graph 130 corresponding to the first modified CPMG measurement, a second graph 132 corresponding to the second modified CPMG measurement, and a third graph 134 corresponding to an out-of-phase removed or corrected echo train. In particular, the first graph 130 shows an excitation pulse 136 at t=0, refocusing pulses 138*a*, 138*b*, 138*c*, 138*d*, 138*e* (e.g., collectively refocusing pulses 138), an NMR FID 139, and NMR echoes 140*a*, 140*b*, 140*c*, 140*d*, 140*e* (e.g., collectively NMR echoes 140 or an out-of-phase corrected echo train) occurring after the refocusing pulses 138. In generally similar manner as described with reference to FIG. 5, only five refocusing pulses 138 and NMR echoes 140 are labeled for simplicity.

The second graph 132 shows an excitation pulse 142 at t=0, refocusing pulses 144*a*, 144*b*, 144*c*, 144*d*, 144*e* (e.g., collectively refocusing pulses 144), an NMR FID 145, and NMR echoes 146*a*, 146*b*, 146*c*, 146*d*, 146*e* (e.g., collectively NMR echoes 146 or a second echo train) occurring after the refocusing pulses 144. The first graph 130 that corresponds to the first modified CPMG measurement satisfies $|\varphi_{90}-\varphi_{180(1)}|=\pi$ while the second graph 132 that corresponds to the second modified CPMG measurement satisfies $|\varphi_{90}-\varphi_{180(1)}|=0$. Both satisfy $|\varphi_{90}-\varphi_{180(2\ldots nE)}|=\pi/2$.

The third graph 134 is the average of the first modified CPMG measurement corresponding to the first graph 130 and the second modified CPMG measurement corresponding to the second graph 132, which yields the NMR FID 147, NMR echoes 148*a*, 148*b*, 148*c*, 148*d*, 148*e* (e.g., collectively NMR echoes 148 or a third echo train). In particular, the third graph 134 yields the same in-phase (real) signal as in each scan, but the out-of-phase (imaginary) signal is canceled. Therefore, anything remaining in the out-of-phase channel may be considered noise.

Figure 8:
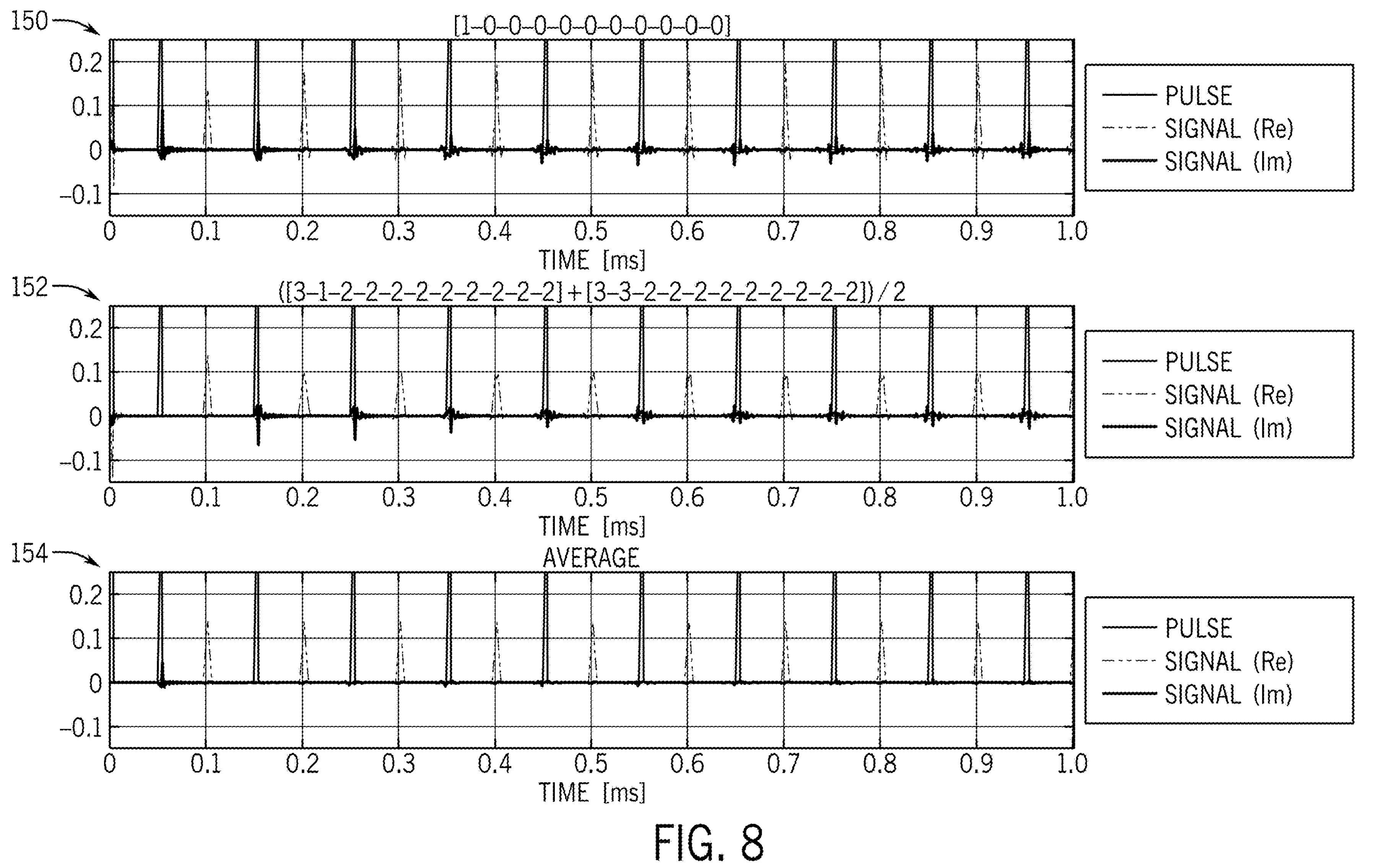
FIG. 8 shows a first graph corresponding to a CPMG measurement, a second graph corresponding to the out-of-phase corrected echo train, and a third graph corresponding to a transient-corrected echo train without out-of-phase components, in accordance with an aspect of the present disclosure.

The out-of-phase corrected echo train 148 may be used to remove echo transient from the NMR signal acquired during a CPMG measurement without adding out-of-phase components. To illustrate this, FIG. 8 shows a first graph 150 corresponding to the CPMG measurement, a second graph 152 corresponding to the out-of-phase corrected echo train obtained using the first modified CPMG measurement and the second modified CPMG measurement, and a third graph 154 corresponding to a transient-corrected echo train without out-of-phase components. In general, the first graph 150 includes substantially similar features as described with respect to the first graph 80 of FIG. 5. The second graph 152 includes substantially similar features as described with respect to the third graph 134 of FIG. 7. For example, the second graph 152 shows the out-of-phase corrected echo train 148. The third graph 154 shows the average of the out-of-phase corrected echo train 148 and the echo train of the CPMG measurement.

It should be noted that the disclosed techniques may be implemented in conventional NMR tools 32. Accordingly, the cost to replace existing measurements with the new measurement is minimal. A conventional CPMG may be performed with a unique set of measurement parameters, such as wait time ($t_W$), echo time ($t_E$), number of echoes ($n_E$), and number of repeats ($n_R$). Later sub-measurements (SMs) with shorter $t_E$ (hence the first echo at earlier timing) have significant impact in determining signal amplitude at t=0. Example measurement parameters are shown below in Table 2.

TABLE 2

| Example measurement parameters | | | | | | | | | |
|---|---|---|---|---|---|---|---|---|---|
| | SM1 | SM2 | SM3 | SM4 | SM5 | SM6 | SM7 | SM8 | SM9 |
| $t_W$ [s] | 10 | 2 | 0.8 | 0.256 | 0.128 | 0.064 | 0.032 | 0.016 | 0.008 |
| $n_R$ [—] | 1 | 1 | 2 | 4 | 8 | 16 | 32 | 64 | 64 |
| $t_E$ [ms] | 0.8 | 0.8 | 0.8 | 0.8 | 0.8 | 0.6 | 0.5 | 0.5 | 0.4 |
| $n_E$ [—] | 2048 | 2048 | 2048 | 256 | 128 | 64 | 32 | 16 | 8 |
| Total [s] | 9.64 | 3.64 | 4.88 | 1.84 | 1.85 | 1.64 | 1.54 | 1.55 | 0.73 |

The modified CPMG may replace any one of the sub-measurements (SM). For example, if the modified CPMG replaces a half of SM9, which uses the shortest $t_E$, signal amplitude may be about 25% smaller than that of the original SM9. Therefore, signal-to-noise ratio (SNR) of SM9 may be about 75% of the original SNR. To recover the SNR, one may repeat SM9 by $1/0.75^2=1.8$ times (i.e., the new $n_{R,9}$ will be 1.8 $n_{R,9}\approx114$) since SNR is proportional to $\sqrt{n_R}$. This may increase the total measurement time by 0.57 seconds, which is only 2% of the total measurement time (27 seconds). If SM6-SM9 are replaced, which use a relatively short $t_E$, the increase in the total measurement time and increase rate may become 4.2 seconds and 15%, respectively; which may be within a threshold degree considering the elimination of measurement error introduced by the echo transient. In certain implementations, the measurement time increase rate may be even smaller, since there are other measurements for tool diagnosis (e.g., gain measurement, noise measurement) performed between each measurement, hence the total measurement time is longer than the 27 seconds mentioned above.

In some embodiments, a processor (e.g., the processor 40, the processor 50, or another suitable processor) may replace a CPMG measurement in one or more sub-measurements with a modified CPMG measurement based on measurement time considerations. For example, the processor 40 may determine that replacing a CPMG measurement with a modified CPMG measurement may increase the total measurement time by an amount. Then, the processor 40 may determine whether the amount is below or within a threshold range. If the amount is below or within the threshold range (e.g., indicating that the replaced measurement will not substantially increase the total measurement time), then the processor 40 may perform the modified CPMG measurement instead of the CPMG measurement.

Aspects of this disclosure also include generating a correction factor for improving the accuracy of NMR measurements. The amount of initial echo transient is dictated by multiple factors, including the distribution of magnetic fields generated by the NMR tool 32, and transmit/receive bandwidths of the NMR tool 32 affected by the operating environment (borehole/formation conductivity). Therefore, the amount of initial echo transient can vary from one NMR tool 32 to another NMR tool 32, and from one job to another job (e.g., variation of operating environment in different locations and/or time periods). Conventional techniques to account for this variation include applying a fixed correction factor. However, this introduces increased error in computed porosity, T1, and/or T2 values when echo transients behave differently in different environment. On certain NMR tools, more rigorous approach may be taken. For example, the correction factor may be computed as a function of frequency (i.e., shell by shell) and the antenna quality factor Q (a proxy of signal bandwidth). However, this may be undesirable because it may utilize a time-consuming characterization on each tool, rather than a common correction factor that can be applied to multiple tools.

For other NMR tools, the use of the first echo may be mandated by engineering guidelines. To achieve this, a transient behavior may be characterized on a master tool, while tool-to-tool variation may be reduced by improving the manufacturing process. Correction factor may be still computed from a measured Q value. However, Q measurement becomes challenging when Q is low (e.g., in a highly conductive environment), resulting in increased uncertainties in transient correction, hence porosity, T1, and/or T2 evaluation. Furthermore, this may operate under the assumption that every tool behaves in the same way under given operating conditions. Even though sensor consistency may be drastically improved, small variations may still exist.

Figure 9:
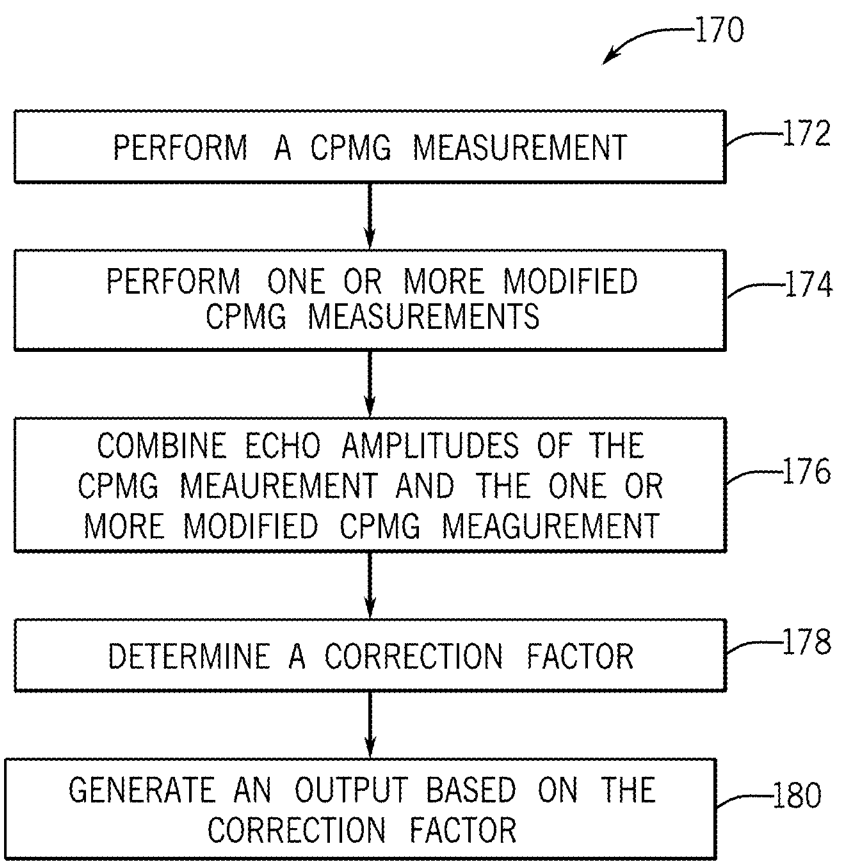
FIG. 9 is a flow chart of a method for generating and utilizing a correction factor for the initial echo transient based on one or more modified CPMG measurements, in accordance with an aspect of the present disclosure.

To obtain a correction factor that can be applied to any tools without time-consuming characterization, it is presently recognized that it may be advantageous to determine a correction factor based on NMR signals measured on each tool, such as a combination of a conventional CPMG measurement and a modified CPMG measurement, rather than inferring it from another measurement (e.g., Q measurement). FIG. 9 provides a flowchart of a method 170 that may be implemented by a processor 40 of the data processing system 38 or the NMR tool 32 to generate an output, such as a porosity measurement and/or T1-T2 measurement. In some instances, the method 170 may be implemented by the processor 40, or other suitable processor to modify well logging operations (e.g., generate an alert on a display, provide visual indications on a well log), drill operations, and the like, of the drilling system 10 based on NMR measurements measured by an NMR sensor of the NMR tool 32. Although the method 170 has been described as being performed by the processor 40, it should be noted that any suitable processing device may perform the method 170, such as the processor 50 of the NMR tool 32.

At block 172, the processor 40 performs a CPMG measurement. In general, the processor 40 may perform block 172 in a generally similar manner as described in block 72 with reference to FIG. 3. At block 174, the processor 40 performs a modified CPMG measurement. In general, the processor 40 may perform block 174 in a generally similar manner as described in block 74 with reference to FIG. 3.

At block 176, the processor 40 combines echo amplitudes of the CPMG measurement (e.g., obtained at block 172) and the modified CPMG measurement (e.g., obtained at block 174). In some embodiments, the processor 40 may compute echo amplitude for each measurement by integrating points around the peak of each echo. For example, this may be done with a filter (e.g., applied in the frequency domain) or a window function (e.g., applied in the time domain). This yields two series of echo amplitudes:

$$A_r = [a_1, a_{2r}, a_{3r}, \ldots, a_{n_E r}] = \left[a_1, a_r e^{-n \cdot \frac{t_E}{T_2}}\right] \tag{1}$$

$$A_m = [a_1, a_{2m}, a_{3m}, \ldots, a_{n_E m}] = \left[a_1, a_m e^{-n \cdot \frac{t_E}{T_2}}\right] \tag{2}$$

The subscripts r and m indicate the source data (conventional CPMG and modified CPMG, respectively), and n=1 . . . $n_E$ represents the echo number. Note that the first echo amplitude $a_1$ is the same between two measurements. Also, the second and subsequent echoes may be replaced by a common decay rate $\exp(-n \cdot t_E/T_2)$ multiplied by unique amplitudes $a_r$ and $a_m$ as shown.

Further, combining the echo amplitudes may include taking the average of the two series of echo amplitudes:

$$A_{avg} = \frac{1}{2}(A_r + A_m) = \left[a_1, a_{avg} e^{-n \cdot \frac{t_E}{T_2}}\right] \tag{3}$$

In equation 3, $$a_{avg} = \frac{1}{2}(a_r + a_m).$$

Since $A_r$ and $A_m$ have the same decay rate, $\exp(-n \cdot t_E/T_2)$, this may be replaced by the average of the sum of echoes of each series to improve SNR, i.e.:

$$a'_{avg} = \frac{1}{2}\left(\sum_{n=2}^{n_E} a_r e^{-n \cdot \frac{t_E}{T_2}} + \sum_{n=2}^{n_E} a_m e^{-n \cdot \frac{t_E}{T_2}}\right) = \frac{1}{2}(a'_r + a'_m) \tag{4}$$

At block 178, the processor 40 determines a correction factor, c. In some embodiments, determining the correction factor includes computing an amplitude correction factor to cancel echo transient. In some embodiments, determining the correction factor includes determining the ratio of an NMR signal of the CPMG measurement to an average of an NMR signal of the CPMG measurement and an NMR signal of the modified CPMG measurement. As one non-limiting example, the correction factor may be computed by dividing a sum of the NMR signal of the CPMG measurement with an average of a sum of the NMR signal of the CPMG measurement and a sum of the NMR signal of the modified CPMG measurement. For example, to determine the correction factor (e.g., amplitude correction factor), the processor 40 may compute the correction factor as a function of the average amplitude, as shown below:

$$c = \frac{a_r}{a_{avg}} = \frac{a_r}{(a_r + a_m)/2} = \frac{2}{1 + a_m/a_r} \tag{5}$$

or $$c' = \frac{a'_r}{a'_{avg}} = \frac{a'_r}{(a'_r + a'_m)/2} = \frac{2}{1 + a'_m/a'_r} \tag{6}$$

It should be noted that that $$\frac{a_m}{a_r} < 1,$$

hence c>1, so that the (smaller) first echo may be multiplied by c (or c'), or the (larger) second and subsequent echoes may be divided by c, to get an echo train with constant amplitude (i.e., a transient-corrected echo train).

At block 180, the processor 40 generates an output based on the correction factor. For example, the output may be a porosity measurement, a T1-T2 measurement, or a combination thereof. In some embodiments, the processor 40 may apply the correction factor obtained in one sub-measurement to other sub-measurements obtained in the same environment (e.g., temperature, salinity). Accordingly, the process 170 provides a technique for generating a correction factor that may be applied to other measurements. In some embodiments, the processor 40 may transmit an alert or otherwise cause a display to notify the amount of correction. In any case, the correction factor may be used to prevent fluids in a subterranean region from being improperly identified or quantified and thus, avoid wasting resources.

Technical effects of the disclosure include improving the accuracy of NMR porosity, T1, and/or T2 measurements by removing or cancelling initial echo transients, without adding out-of-phase components to the NMR signals. Accordingly, the techniques may improve oil and gas decisions that are informed using NMR measurements by improving the accuracy of the NMR measurements. Furthermore, technical effects of the present disclosure include determining a correction factor that may be applied to other NMR measurements (e.g., obtained during a different time period but in the same operating conditions). In particular, utilizing the correction factor may reduce the number of measurements that are utilized to obtain a transient-corrected echo train. In this way, the correction factor may improve the efficiency of oil and gas operations because computational resources and NMR tools 32 can be utilized to perform other operations instead of obtaining the measurements utilized for correcting echo transient.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for (perform)ing (a function) . . . ” or “step for (perform)ing (a function) . . . ”, it is intended that such elements are to be interpreted under 35 U.S.C. 112(f). However, for any claims containing elements designated in any other manner, it is intended that such elements are not to be interpreted under 35 U.S.C. 112(f).

Further aspects of the invention are provided by the subject matter of the following clauses:

A method, comprising performing, using a nuclear magnetic resonance (NMR) tool, a Carr-Purcell-Meiboom-Gill (CPMG) measurement by transmitting a first excitation pulse and a first plurality of refocusing pulses, and obtaining a first set of NMR echo signals; performing, using the NMR tool, a modified CPMG measurement by transmitting a second excitation pulse and a second plurality of refocusing pulses, and obtaining a second set of NMR echo signals, wherein the second excitation pulse is shifted by 0 or π radians relative to the first excitation pulse, and wherein a first refocusing pulse of the second plurality of refocusing pulses is shifted by 0 or π radians relative to the second excitation pulse, and wherein a second refocusing pulse and subsequent refocusing pulses of the second plurality of refocusing pulses are shifted by π/2 or −π/2 radians relative to the second excitation pulse; and obtaining a transient-corrected echo train based on the CPMG measurement and the modified CPMG measurement.

The method of any preceding clause, wherein obtaining the transient-corrected echo train comprises averaging the NMR signal of the CPMG measurement and the NMR signal of the modified CPMG measurement.

The method of any preceding clause, further comprising performing an additional modified CPMG measurement comprising transmitting a third excitation pulse and a third plurality of refocusing pulses and obtaining a third set of NMR echo signals, wherein a third excitation pulse has the same phase as the second excitation pulse, wherein a first refocusing pulse of the third plurality of refocusing pulses is shifted by π radians relative to the first refocusing pulse of the second plurality of refocusing pulses, and wherein the second refocusing pulse and subsequent refocusing pulses of the third plurality of refocusing pulses have the same phase as the second refocusing pulse and the subsequent refocusing pulses of the second plurality of refocusing pulses; and obtaining an out-of-phase corrected echo train based on the modified CPMG measurement and the additional modified CPMG measurement.

The method of any preceding clause, comprising obtaining the transient-corrected echo train based on the CPMG measurement and the out-of-phase corrected echo train.

The method of any preceding clause, further comprising obtaining a porosity measurement, a T1 measurement, a T2 measurement, or a combination thereof, based on the transient-corrected echo train.

The method of any preceding clause, further comprising outputting an alert based on the transient-corrected echo train.

A method includes performing, using an NMR tool, a Carr-Purcell-Meiboom-Gill (CPMG) measurement by transmitting a first excitation pulse and a first plurality of refocusing pulses, and obtaining a first set of NMR echo signals; performing, using the NMR tool, a modified CPMG measurement by transmitting a second excitation pulse and a second plurality of refocusing pulses and obtaining a second set of NMR echo signals, wherein the second excitation pulse is shifted by 0 or π radians relative to the first excitation pulse, wherein a first refocusing pulse of the second plurality of refocusing pulses is shifted by 0 or π radians relative to the second excitation pulse, and wherein a second refocusing pulse and subsequent refocusing pulses of the second plurality of refocusing pulses are shifted by π/2 or −π/2 relative to the second excitation pulse; and determining a correction factor based on the CPMG measurement and the modified CPMG measurement.

The method of any preceding clause, wherein determining the correction factor comprises combining amplitudes of the first set of NMR echo signals with amplitudes of the second set of NMR echo signals; and determining the correction factor based on the combined amplitudes.

The method of any preceding clause, comprising determining the correction factor based on a transient-corrected echo train.

The method of any preceding clause, wherein determining the correction factor comprises computing an amplitude ratio of the echo transient by dividing amplitudes of NMR signal of the CPMG measurement with an average of amplitudes of NMR signal of the CPMG measurement and amplitudes of NMR signal of the modified CPMG measurement.

The method of any preceding clause, wherein amplitudes of the NMR signal of the CPMG measurement and amplitudes of the NMR signal of the modified CPMG measurement are obtained by summing NMR echo signals that occur after the second refocusing pulse of the first plurality of refocusing pulses and by summing NMR echo signals that occur after the second refocusing pulse of the second plurality of refocusing pulses, respectively.

The method of any preceding clause, further comprising correcting for an initial echo transient in other CPMG measurements obtained in the same environment using the correction factor.

The method of any preceding clause, further comprising adjusting an operation of a downhole tool based on the correction factor.

The method of any preceding clause, further comprising determining a porosity measurement, a T1 measurement, a T2 measurement, or a combination thereof, based on the correction factor.

A system comprises an NMR tool. The system includes a control system comprising a plurality of processors, wherein the control system is configured to perform, using the NMR tool, a Carr-Purcell-Meiboom-Gill (CPMG) measurement by transmitting a first excitation pulse and a first plurality of refocusing pulses, and obtaining a first set of NMR echo signals; perform, using the NMR tool, a modified CPMG measurement by transmitting a second excitation pulse and a second plurality of refocusing pulses and obtaining a second set of NMR echo signals, wherein the second excitation pulse is shifted by 0 or π radians relative to the first excitation pulse, wherein a first refocusing pulse of the second plurality of refocusing pulses is shifted by 0 or π radians relative to the second excitation pulse, and wherein a second refocusing pulse and subsequent refocusing pulses of the second plurality of refocusing pulses are shifted by π/2 or −π/2 radians relative to the second excitation pulse; and obtain a transient-corrected echo train based on the CPMG measurement and the modified CPMG measurement.

The system of any preceding clause, wherein the control system is configured to determine a correction factor based on the transient-corrected echo train.

The system of any preceding clause, wherein the control system is configured to obtain a porosity measurement, a T1 measurement, a T2 measurement, or a combination thereof, based on the transient-corrected echo train.

The system of any preceding clause, wherein the control system is configured to obtain the transient-corrected echo train by combining the first set of NMR echo signals and the second set of NMR echo signals.

The system of any preceding clause, wherein the control system is configured to perform an additional modified CPMG measurement comprising transmitting a third excitation pulse and a third plurality of refocusing pulses and obtaining a third set of NMR echo signals, wherein the third excitation pulse has the same phase as the second excitation pulse, wherein a first refocusing pulse of the third plurality of refocusing pulses is shifted by π radians relative to the first refocusing pulse of the second plurality of refocusing pulses, and wherein the second refocusing pulse and subsequent refocusing pulses of the third plurality of refocusing pulses have the same phase as the second refocusing pulse and the subsequent refocusing pulses of the second plurality of refocusing pulses; and obtain an out-of-phase corrected echo train based on the modified CPMG measurement and the additional modified CPMG measurement.

The system of any preceding clause, wherein the control system is configured to obtain the transient-corrected echo train based on the CPMG measurement and the out-of-phase corrected echo train.

The invention claimed is:

1. A method, comprising:

performing, using a nuclear magnetic resonance (NMR) tool, a Carr-Purcell-Meiboom-Gill (CPMG) measurement by transmitting a first excitation pulse and a first plurality of refocusing pulses, and obtaining a first set of NMR echo signals;

performing, using the NMR tool, a modified CPMG measurement by transmitting a second excitation pulse and a second plurality of refocusing pulses, and obtaining a second set of NMR echo signals, wherein:

the second excitation pulse is shifted by 0 or π radians relative to the first excitation pulse;

a first refocusing pulse of the second plurality of refocusing pulses is shifted by 0 or π radians relative to the second excitation pulse;

a second refocusing pulse and subsequent refocusing pulses of the second plurality of refocusing pulses are shifted by π/2 or −π/2 radians relative to the second excitation pulse; and the first refocusing pulse of the second plurality of refocusing pulses is transmitted before the second refocusing pulse and the subsequent refocusing pulses of the second plurality of refocusing pulses; and obtaining a transient-corrected echo train based on the CPMG measurement and the modified CPMG measurement.

2. A method, comprising:

performing, using an NMR tool, a Carr-Purcell-Meiboom-Gill (CPMG) measurement by transmitting a first excitation pulse and a first plurality of refocusing pulses, and obtaining a first set of NMR echo signals;

performing, using the NMR tool, a modified CPMG measurement by transmitting a second excitation pulse and a second plurality of refocusing pulses and obtaining a second set of NMR echo signals, wherein;

the second excitation pulse is shifted by 0 or π radians relative to the first excitation pulse;

a first refocusing pulse of the second plurality of refocusing pulses is shifted by 0 or π radians relative to the second excitation pulse;

a second refocusing pulse and subsequent refocusing pulses of the second plurality of refocusing pulses are shifted by π/2 or −π/2 radians relative to the second excitation pulse; and the first refocusing pulse of the second plurality of refocusing pulses is transmitted before the second refocusing pulse and the subsequent refocusing pulses of the second plurality of refocusing pulses; and determining a correction factor based on the CPMG measurement and the modified CPMG measurement.

3. A system, comprising:

an NMR tool;

a control system comprising a plurality of processors, wherein the control system is configured to:

perform, using the NMR tool, a Carr-Purcell-Meiboom-Gill (CPMG) measurement by transmitting a first excitation pulse and a first plurality of refocusing pulses, and obtaining a first set of NMR echo signals;

perform, using the NMR tool, a modified CPMG measurement by transmitting a second excitation pulse and a second plurality of refocusing pulses and obtaining a second set of NMR echo signals, wherein:

the second excitation pulse is shifted by 0 or π radians relative to the first excitation pulse;

a first refocusing pulse of the second plurality of refocusing pulses is shifted by 0 or π radians relative to the second excitation pulse;

a second refocusing pulse and subsequent refocusing pulses of the second plurality of refocusing pulses are shifted by π/2 or −π/2 radians relative to the second excitation pulse; and the first refocusing pulse of the second plurality of refocusing pulses is transmitted before the second refocusing pulse and the subsequent refocusing pulses of the second plurality of refocusing pulses; and obtain a transient-corrected echo train based on the CPMG measurement and the modified CPMG measurement.

4. The method of claim 1, wherein obtaining the transient-corrected echo train comprises averaging the NMR signal of the CPMG measurement and the NMR signal of the modified CPMG measurement.

5. The method of claim 1, further comprising:

performing an additional modified CPMG measurement comprising transmitting a third excitation pulse and a third plurality of refocusing pulses and obtaining a third set of NMR echo signals, wherein:

the third excitation pulse has the same phase as the second excitation pulse;

wherein a first refocusing pulse of the third plurality of refocusing pulses is shifted by π radians relative to the first refocusing pulse of the second plurality of refocusing pulses;

wherein the second refocusing pulse and subsequent refocusing pulses of the third plurality of refocusing pulses have the same phase as the second refocusing pulse and the subsequent refocusing pulses of the second plurality of refocusing pulses; and the first refocusing pulse of the third plurality of refocusing pulses is transmitted before the second refocusing pulse and the subsequent refocusing pulses of the third plurality of refocusing pulses; and obtaining an out-of-phase corrected echo train based on the modified CPMG measurement and the additional modified CPMG measurement.

6. The method of claim 1, further comprising obtaining a porosity measurement, a T1 measurement, a T2 measurement, or a combination thereof, based on the transient-corrected echo train.

7. The method of claim 1, further comprising outputting an alert based on the transient-corrected echo train.

8. The method of claim 2, wherein determining the correction factor comprises:

combining amplitudes of the first set of NMR echo signals with amplitudes of the second set of NMR echo signals; and determining the correction factor based on the combined amplitudes.

9. The method of claim 2, comprising determining the correction factor based on a transient-corrected echo train.

10. The method of claim 2, wherein determining the correction factor comprises computing an amplitude ratio of an echo transient of the CPMG measurement and the modified CPMG measurement by dividing amplitudes of NMR signal of the CPMG measurement with an average of amplitudes of NMR signal of the CPMG measurement and amplitudes of NMR signal of the modified CPMG measurement.

11. The method of claim 2, further comprising correcting for an initial echo transient in other CPMG measurements obtained in the same environment using the correction factor.

12. The method of claim 2, further comprising adjusting an operation of a downhole tool based on the correction factor.

13. The system of claim 3, wherein the control system is configured to determine a correction factor based on the transient-corrected echo train.

14. The system of claim 3, wherein the control system is configured to obtain a porosity measurement, a T1 measurement, a T2 measurement, or a combination thereof, based on the transient-corrected echo train.

15. The system of claim 3, wherein the control system is configured to obtain the transient-corrected echo train by combining the first set of NMR echo signals and the second set of NMR echo signals.

16. The system of claim 3, wherein the control system is configured to:

perform an additional modified CPMG measurement comprising transmitting a third excitation pulse and a third plurality of refocusing pulses and obtaining a third set of NMR echo signals, wherein:

the third excitation pulse has the same phase as the second excitation pulse;

a first refocusing pulse of the third plurality of refocusing pulses is shifted by π radians relative to the first refocusing pulse of the second plurality of refocusing pulses;

the second refocusing pulse and subsequent refocusing pulses of the third plurality of refocusing pulses have the same phase as the second refocusing pulse and the subsequent refocusing pulses of the second plurality of refocusing pulses; and the first refocusing pulse of the third plurality of refocusing pulses is transmitted before the second refocusing pulse and the subsequent refocusing pulses of the third plurality of refocusing pulses; and obtain an out-of-phase corrected echo train based on the modified CPMG measurement and the additional modified CPMG measurement.

17. The method of claim 2, further comprising:

performing an additional modified CPMG measurement comprising transmitting a third excitation pulse and a third plurality of refocusing pulses and obtaining a third set of NMR echo signals, wherein:

the third excitation pulse has the same phase as the second excitation pulse;

a first refocusing pulse of the third plurality of refocusing pulses is shifted by π radians relative to the first refocusing pulse of the second plurality of refocusing pulses;

the second refocusing pulse and subsequent refocusing pulses of the third plurality of refocusing pulses have the same phase as the second refocusing pulse and the subsequent refocusing pulses of the second plurality of refocusing pulses; and the first refocusing pulse of the third plurality of refocusing pulses is transmitted before the second refocusing pulse and the subsequent refocusing pulses of the third plurality of refocusing pulses; and obtaining an out-of-phase corrected echo train based on the modified CPMG measurement and the additional modified CPMG measurement.

18. The method of claim 5, comprising obtaining the transient-corrected echo train based on the CPMG measurement and the out-of-phase corrected echo train.

19. The method of claim 10, wherein amplitudes of the NMR signal of the CPMG measurement and amplitudes of the NMR signal of the modified CPMG measurement are obtained by summing NMR echo signals that occur after the second refocusing pulse of the first plurality of refocusing pulses and by summing NMR echo signals that occur after the second refocusing pulse of the second plurality of refocusing pulses, respectively.

20. The system of claim 16, wherein the control system is configured to:

obtain the transient-corrected echo train based on the CPMG measurement and the out-of-phase corrected echo train.

* * * * *